May 2, 1950  B. N. ASHTON  2,506,128

PLUNGER ACTUATED VALVE

Filed May 3, 1945

INVENTOR
Benjamin N. Ashton
BY
his ATTORNEYS

Patented May 2, 1950

2,506,128

UNITED STATES PATENT OFFICE 2,506,128

PLUNGER ACTUATED VALVE

Benjamin N. Ashton, Kingston, N. Y., assignor to Electrol Incorporated, Kingston, N. Y., a corporation of Delaware Application May 3, 1945, Serial No. 591,754

4 Claims. (Cl. 137—139)

This invention relates to valves, and it relates particularly to an improved type of plunger or push rod actuated valve.

An object of the present invention is to provide a quick acting valve which is operated by the action of fluid pressure thereon.

Another object of the invention is to provide a plunger operated valve that is closed and opened by fluid pressure under the control of an actuating plunger.

Other objects of the invention will become apparent from the following description of a typical form of valve embodying the present invention.

Such a valve includes a valve seat and a cooperating valve plug for controlling the flow of fluid from an inlet port to an outlet port, the valve plug being urged toward the valve seat by means of fluid pressure and simultaneously being urged with stronger force away from the seat by the fluid pressure exerted on a plunger that may be actuated manually or otherwise from the exterior of the valve casing.

More particularly, the valve plug is provided with a piston on the discharge or outlet side of the valve seat that is subjected to fluid pressure when the valve is open to urge the valve plug against the seat. The valve plug normally is maintained unseated by means of a plunger projecting from the valve casing and loosely connected to the valve plug that has a larger area exposed to fluid pressure than the area of the piston or the area of the valve plug upon which the fluid acts in retaining the valve plug seated.

The above described valve does not require springs for moving the valve plug and inasmuch as its movement is caused by the pressure of the fluid, it acts quickly in either direction with substantially a snap action. Thus, when the plunger is pressed inwardly, the fluid pressure acts on the piston and the valve plug is snapped into engagement with the seat. When the plunger is released, the pressure acts on the plunger to project it, and the plunger in turn unseats the valve plug.

For a better understanding of the present invention, reference may be had to the accompanying drawing in which.

Figure 2:
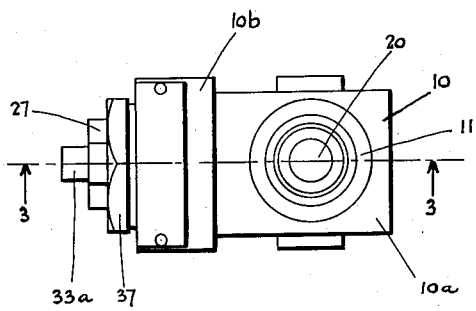
Figure 2 is a top plan view of the valve.
Figure 1:
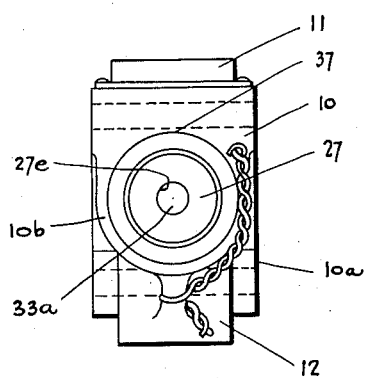
Figure 1 is a view in end elevation of a typical form of valve embodying the present invention.
Figure 3:
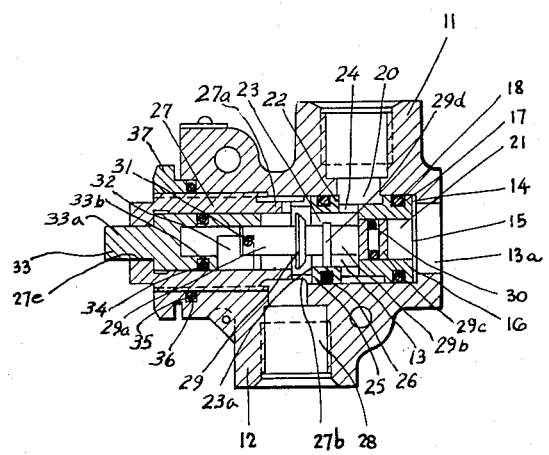
Figure 3 is a view in section taken on line 3—3 of Figure 2.

The form of valve chosen for purposes of illustration may include a valve casing 10 having one end portion 10a of generally rectangular form in plan and elevation and having an enlarged portion 10b at one end. The upper surface of the body portion 10a is provided with a coupling 11 which is internally threaded to permit it to be connected to a suitable conduit or the like. The under portion of the body 10a is also provided with a threaded coupling 12 which may be connected to a source of fluid under pressure. As best shown in Figure 3, the couplings 11 and 12 forming respectively the outlet and the inlet port of the valve are staggered with relation to each other and are spaced axially of the valve.

The valve casing 10 is provided with a longitudinally extending bore or passage 13 for receiving the operating elements of the valve. The passage 13 has a reduced portion 13a providing a shoulder 14 against which may be seated a disk 15 formed of metal or wire mesh. Abutting the disk 15 is a sleeve member 16 having a grooved flange 17 at its right hand end which engages the disk 15. The grooved flange receives a sealing ring 18 for preventing leakage of fluid around the sleeve. The flange is disposed outwardly of the passage or outlet port 20 where it communicates with the passage 13. The sleeve 16 includes a central opening 21 extending axially and concentrically with respect to the passage 13 which forms a cylinder, the purpose of which will be described later.

Abutting the inner end of the sleeve 16 is another sleeve member 22 having a passage 23 therethrough and suitable openings 24 therein permitting the flow of liquid through the opening 23 and the passages 24 to the outlet port 20. The left hand end of the sleeve 22 is provided with a grooved flange 25 for receiving an annular, rubbery ring 26 that seals the sleeve to the wall of the passage 13. The edge 23a of the sleeve defining the left hand end of the opening 23 therethrough acts as a valve seat. The two sleeves 16 and 22 and the disk 15 are retained in position by means of a third sleeve 27 which is threaded into the left hand end of the passage 13 and is provided with an annular portion 27a having an external diameter less than the diameter of the passage 13 engaging the sleeve 22. This annular portion 27a is provided with suitable openings 27b to permit the flow of fluid through the inlet port 28 in the coupling 12 and through the valve sleeve 22 to the outlet port 20.

The flow of liquid or fluid through the valve is controlled by means of a valve plug 29 of generally conical form that is located in the sleeve 27 for axial movement toward and away from the valve seat. The valve plug 29 is provided with stem portions 29a and 29b projecting axially in opposite directions. The valve stem portion 29b is provided with an enlarged piston 29c fitting within the cylinder 21 of the sleeve 16. The piston 29c is provided with a peripheral groove and a sealing ring 30 of rubbery material to prevent leakage.

The stem portion 29b may also be provided with a semi-circular flange 29d having an arcuate edge extending slightly more than 180° for centering the valve stem and the valve plug 29 with respect to the valve seat.

The stem portion 29a is provided with a cross pin 31 which is received in an elongated slot 32 in an operating plunger 33. The stem 29a is received telescopically within the plunger 33. The plunger 33 is slidably mounted in the sleeve 27 for movement axially thereof and is provided with a reduced actuating or push button portion 33a which projects through an aperture 27e in the outer end of the sleeve 27. In order to prevent leakage of fluid between the plunger 33 and the sleeve 27, the plunger 31 may be provided with a groove 33b containing a sealing ring 34.

Leakage between the sleeve 27 and the casing 10 is prevented by means of a packing ring 35 received in a groove 36 concentric with the sleeve and compressed by means of a nut member 37 threaded on the exterior of the sleeve 27.

In order to unseat the valve plug 29, the inner end of the plunger 33 is made of larger diameter than the piston 29c and also of larger diameter than the valve seat 23a.

In operation, with the parts in the positions shown in Figure 3, when the plunger 33 is pressed inwardly, the fluid pressure urges the piston 29c to the right, and the valve 29 begins to move toward the right. As it approaches the seat 22, the fluid pressure acts on the valve plug 29 with increasing force and thereby snaps it against the valve seat 23a. This action relieves the pressure on the piston 29c but the valve is maintained seated by the fluid pressure acting on the left hand side of the valve plug 29 so long as the plunger 33 is pressed inwardly.

When the plunger 33 is released, the fluid pressure will immediately push it to the left as viewed in Figure 3 and will exert a strain on the valve stem 29a tending to unseat the valve plug. Inasmuch as the effective area of the valve plug 29 is somewhat less than the effective area of the plunger 33, the valve plug 29 will be pulled off the seat and its movement will be accelerated as the pressures on opposite sides of the plug become equal.

The above described valve does not require careful manipulation of the plunger for actuating the valve. The plunger can be pushed in quickly and the valve plug will then snap into closed position. Upon release of the plunger, the movement of the valve begins slowly and then will snap suddenly to fully open position.

It will be understood that the valve is susceptible to considerable modification in the shape and arrangement of the casing and the size and location of the various parts. Moreover, some of the various sleeves described above may be combined in one unitary part instead of being formed separately. Therefore, the form of valve described above should be considered as illustrative of the invention and not as limiting the scope of the following claims.

I claim:

1. A valve comprising a casing having a passage therein connecting an inlet port and an outlet port, a valve seat in said passage between said ports, a valve plug movable axially of said passage into and out of engagement with said seat, means connected to said valve plug and responsive to fluid pressure for urging said valve into engagement with said seat, and a plunger in said passage and projecting from said casing loosely connected to said valve plug and responsive to fluid pressure for urging said valve plug out of engagement with said seat with greater strength than said valve plug is urged against the seat.

2. A valve comprising a casing having an inlet port, an outlet port, and a bore communicating with said ports, a valve seat in said bore between said ports, a valve movable relatively to said valve seat and having a stem extending axially of said bore, means at one end of said stem responsive to fluid pressure in said bore for urging said valve into said seat, and an operating plunger loosely connected to said stem and being responsive to fluid pressure for urging said valve away from said seat with greater force than said valve urging means.

3. A valve comprising a casing having a bore therein connecting an inlet port and an outlet port, a valve seat in said bore between said ports, a valve plug cooperating with said seat and movable toward and away from said seat, piston means fixed to said valve responsive to pressure of fluid in said bore for urging said valve plug against said seat, and a plunger loosely coupled to said valve plug having a portion projecting from said casing, said plunger having a portion disposed within said bore and exposed to fluid pressure, the area of said portion being sufficient to overcome the effect of said piston means and to move said valve plug away from said seat.

4. A valve comprising a casing having a passage therein connecting an inlet port and an outlet port spaced axially of said passage, a valve seat in said passage between said ports, a cylinder in said passage on the opposite side of said outlet port from said valve seat, a valve plug disposed between said inlet port and said valve seat and movable axially of said passage into and out of engagement with said valve seat, a piston connected to said valve plug disposed in said cylinder and movable in response to fluid pressure to urge said valve plug toward said seat, a plunger on the opposite side of said valve plug from said piston, said plunger having a portion projecting from said casing and a portion within said passage of larger diameter than the diameters of said piston and the zone of engagement between said valve plug and said valve seat, and means connecting said plunger to said valve plug for limited relative axial movement.

BENJAMIN N. ASHTON.

REFERENCES CITED

The following references are of record in the file of this patent:

UNITED STATES PATENTS

| Number | Name | Date |
| --- | --- | --- |
| 629,894 | Dunlap | Aug. 1, 1899 |
| 817,773 | Hennebohle | Apr. 17, 1906 |
| 1,513,020 | Adams | Oct. 28, 1924 |

FOREIGN PATENTS

| Number | Country | Date |
| --- | --- | --- |
| 10,391 | Switzerland | June 1, 1895 |
| 11,037 | Great Britain | May 4, 1910 |